United States Patent [19]
Kubo

[11] Patent Number: 5,319,460
[45] Date of Patent: Jun. 7, 1994

[54] IMAGE SIGNAL PROCESSING DEVICE INCLUDING FRAME MEMORY

[75] Inventor: Ryoji Kubo, Tokyo, Japan

[73] Assignee: Canon Kabushiki Kaisha, Tokyo, Japan

[21] Appl. No.: 934,720

[22] Filed: Aug. 24, 1992

[30] Foreign Application Priority Data

Aug. 29, 1991 [JP] Japan .................. 3-218572
Aug. 29, 1991 [JP] Japan .................. 3-218575

[51] Int. Cl.⁵ .................................. H04N 5/00
[52] U.S. Cl. .......................... 348/715; 358/444
[58] Field of Search ........... 358/21 R, 160, 140, 358/444; H04N 5/00

[56] References Cited

U.S. PATENT DOCUMENTS

| | | | |
|---|---|---|---|
| 4,272,787 | 6/1981 | Michael et al. | 358/160 |
| 4,477,830 | 10/1984 | Lindman et al. | 358/21 R X |
| 4,506,298 | 3/1985 | Mansell et al. | 358/160 |
| 4,555,572 | 6/1984 | Malden | 358/160 |
| 4,683,497 | 7/1987 | Mehrgardt | 358/160 X |
| 4,689,660 | 8/1987 | Kashigi | 358/21 R X |
| 4,745,462 | 5/1988 | Dischert | 358/21 R |

*Primary Examiner*—Mark R. Powell
*Attorney, Agent, or Firm*—Robin, Blecker, Daley & Driscoll

[57] ABSTRACT

An image signal processing device having a frame memory which includes a first-field storage area for storing a first-field image signal and a second-field storage area for storing a second-field image signal and is capable of storing an image signal for one frame is arranged to cause the frame memory to store the image signal for one frame by every field in separate storage areas, and, after that, in reading out the second-field image signal included in the image signal for one frame stored in the frame memory, to temporarily store in the first-field storage area the second-field image signal which has been stored in the second-field storage area, and then read out the second-field image signal. This arrangement enables the device to efficiently use the memory and to stably output the image signal without any image turbulence. The arrangement thus enhances the operability of the device.

15 Claims, 7 Drawing Sheets

IMAGE SIGNAL PROCESSING DEVICE INCLUDING FRAME MEMORY

BACKGROUND OF THE INVENTION

1. Field of the Invention

This invention relates to an image signal processing device for processing image signals and more particularly to an image signal processing device of the kind having an image memory arranged to temporarily store an input image signal and, after that, to output the image signal stored.

2. Description of the Related Art

Some of the conventional image signal processing devices are provided with image memories which are arranged to temporarily store input image signals and, after that, to output the image signals stored.

The image signal processing devices of the above-stated kind include, for example, an electronic still video camera. An FIFO (first-in/first-out) memory is popularly employed as the image memory for the electronic still video camera, because it requires a relatively few number of wiring connections; it is controllable by a simple memory controller; it permits data writing and data reading at a high speed; etc.

The conventional image signal processing device using the FIFO memory as a frame memory is arranged as follows: in storing an image signal for one frame, a first-field image signal is stored in a first-half address area among addresses of the frame memory and a second-field image signal is stored in a latter-half address area.

However, in repeatedly reading out an image signal for one frame stored in the frame memory by every field, the conventional image signal processing device does not allow a second-field image signal to be repeatedly read out, although a first-field image signal can be repeatedly read out, because the frame memory is an FIFO memory. If the frame memory is used, for example, as a field memory, the frame memory allows the writing or reading of only an image signal for one field despite of its storage capacity of storing an image signal for two fields. In a case where field image signals of two different kinds are to be temporarily stored and the stored field image signals of two different kinds are outputted by switching them from one kind over to the other, therefore, the field image signal of one kind must be stored and read out separately from the field image signal of the other kind. It is thus impossible to make instantaneous switch-over of one field image signal over to the other field image signal. The operability of the conventional image signal processing device, therefore, has been very poor.

SUMMARY OF THE INVENTION

It is, therefore, a general object of this invention to provided an image signal processing device which is capable of solving the problem of the prior art described in the foregoing.

It is a more specific object of this invention to provide an image signal processing device which excels in operability for temporarily storing an input image signal and for outputting the image signal stored.

Under this object, an image signal processing device arranged as an embodiment of this invention to process image signals comprises a frame memory arranged to have a first-field storage area for storing a first-field image signal and a second-field storage area for storing a second-field image signal and to be capable of storing an image signal for one frame including the first-field image signal and the second-field image signal; and memory control means arranged to cause the frame memory to store the image signal for one frame by every field in separate storage areas, and, after that, in reading out the second-field image signal included in the image signal for one frame stored in the frame memory, to temporarily store in the first-field storage area the second-field image signal which has been stored in the second-field storage area, and then read out the second-field image signal.

It is another object of the invention to provide an image signal processing device which is arranged to temporarily store an input image signal in an image memory and to be capable of outputting the stored input image signal in a stable state without any image turbulence.

Under that object, an image signal processing device arranged as an embodiment of this invention to process image signals comprises a frame memory arranged to have a first-field storage area for storing a first-field image signal and a second-field storage area for storing a second-field image signal and to be capable of storing an image signal for one frame including the first-field image signal and the second-field image signal; memory control means arranged to cause the frame memory to store the image signal for one frame by every field in separate storage areas, and, after that, in reading out the second-field image signal included in the image signal for one frame stored in the frame memory, to temporarily store in the first-field storage area the second-field image signal which has been stored in the second-field storage area, and then read out the second-field image signal; and system clock signal generation means for generating, when an input image signal is stored in the frame memory, a system clock signal for operating the frame memory by frequency-dividing a source oscillation clock signal by using a frequency divider arranged to be reset in synchronism with a horizontal synchronizing signal included in the input image signal and for generating, when the second-field image signal is read out from the frame memory by the memory control means and the read-out second-field image signal is again stored in the first-field storage area of the frame memory, a system clock signal for operating the frame memory by continuously frequency-dividing the source oscillation clock signal without resetting the frequency divider in synchronism with the horizontal synchronizing signal.

It is a further object of the invention to provide an image signal processing device which is capable of efficiently using an image memory for temporarily storing an input image signal and, after that, for outputting the image signal stored.

Under the above-stated object, an image signal processing device arranged according to this invention to process an image signal composed of a luminance signal and a color information signal comprises a frame memory capable of storing an image signal for one frame, including first and second field memories each of which has a storage area for storing an image signal for one field; and memory control means arranged to have a first-field image signal and a second-field image signal serially inputted thereto, to store the luminance signal of the first-field image signal in a high-order address of the first field memory, to store the color information signal of the first-field image signal in a high-order address of the second field memory, to store the color information signal of the second-field image signal in a low-order address of the first field memory and to store the luminance signal of the second-field image signal in a low-order address of the second field memory.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
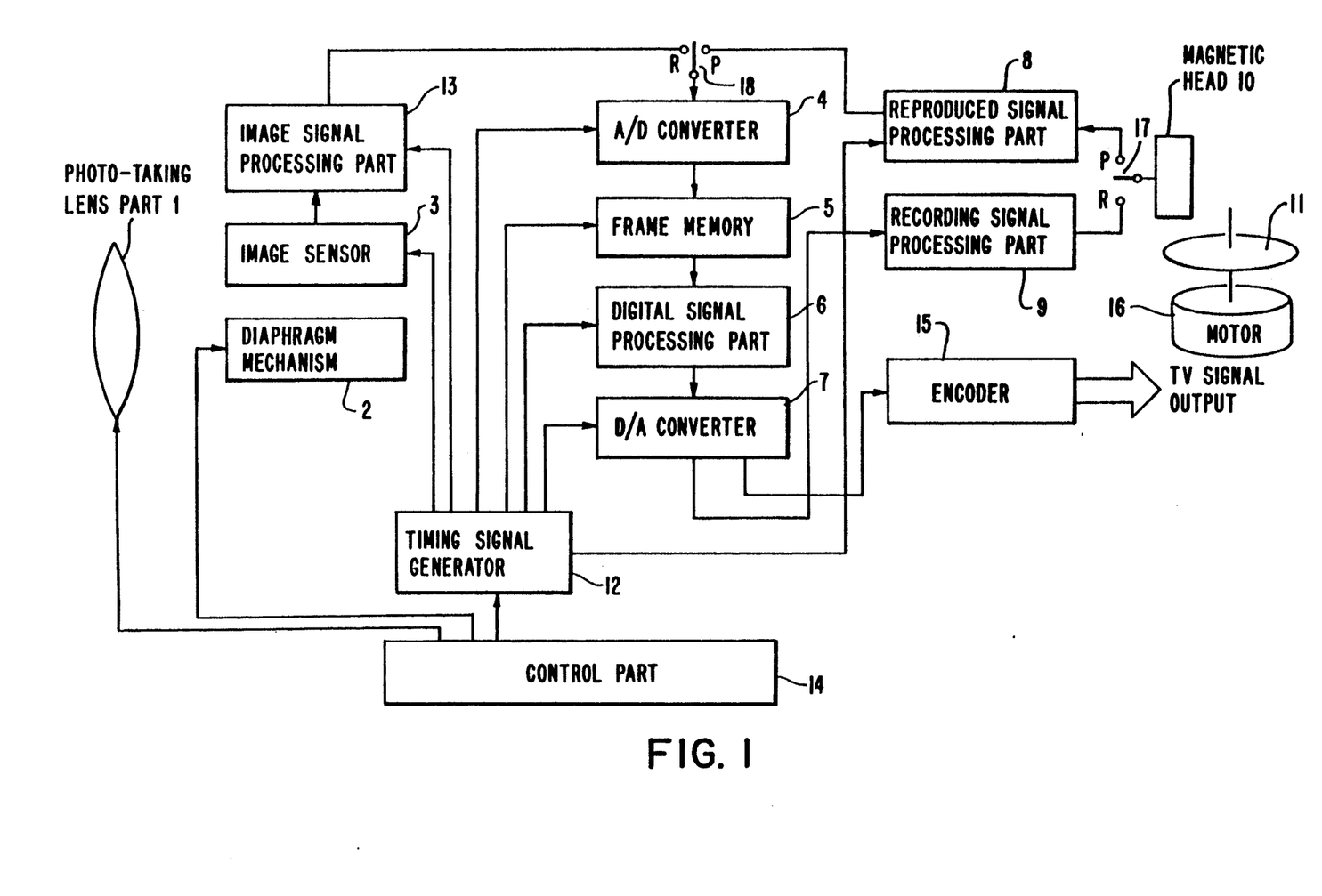
FIG. 1 is a block diagram showing in outline the arrangement of an electronic still video camera to which this invention is applied as an embodiment thereof.
Figure 2:
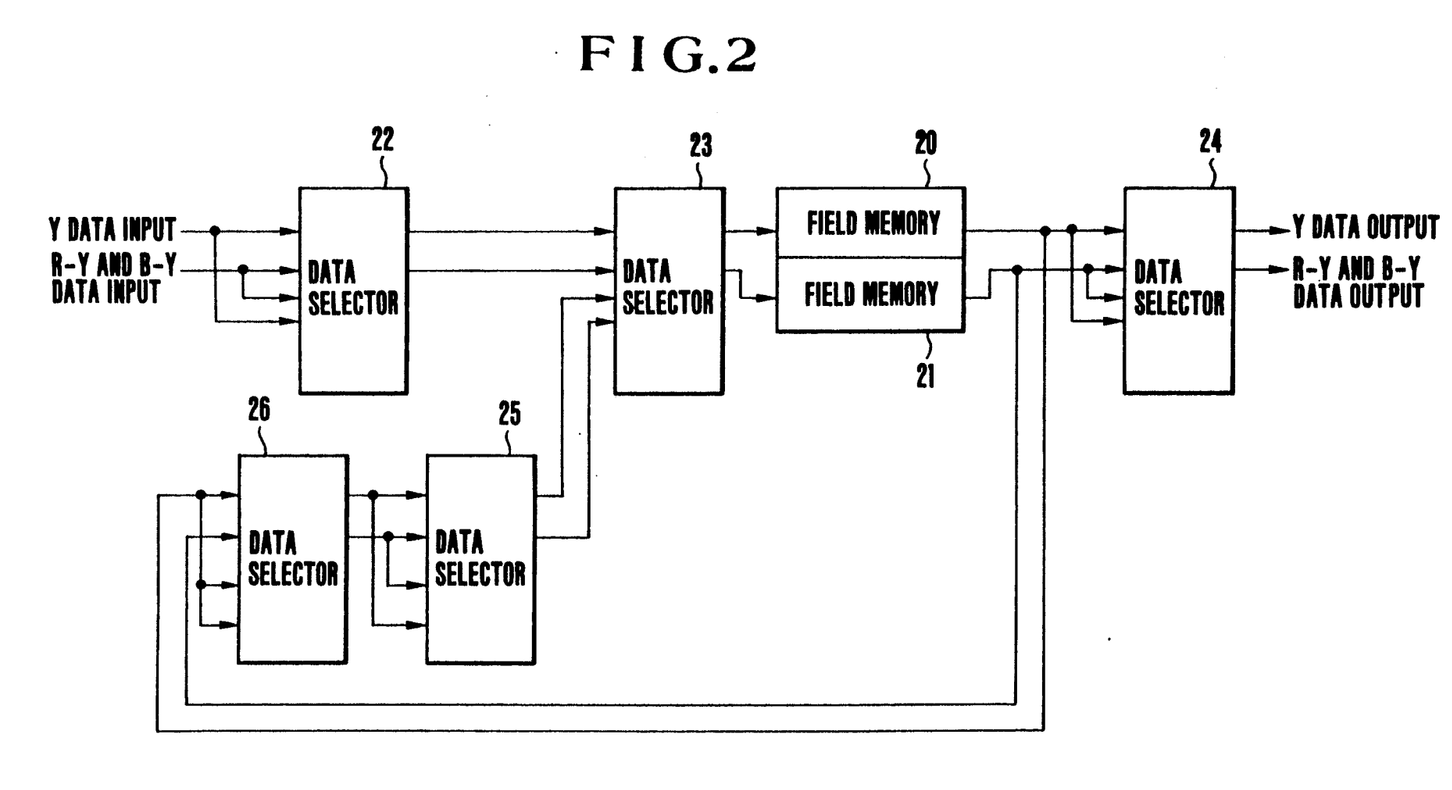
FIG. 2 is a block diagram showing in detail the arrangement of a frame memory 5 shown in FIG. 1.

The details of this invention are described below through an embodiment of this invention:

FIG. 1 is a block diagram showing in outline the arrangement of an electronic still video camera to which this invention is applied as an embodiment. Referring to FIG. 1, an image sensor 3 is arranged to convert an image picked up through a photo-taking lens part 1 and a diaphragm mechanism 2 into an electrical signal, i.e., an image signal. The image signal is outputted from the image sensor 3 and supplied to an image signal processing part 13, which is arranged to form, from the image signal, a luminance signal (hereinafter referred to as a Y signal) and two kinds of color-difference signals (hereinafter referred to as R-Y and B-Y signals). An A/D (analog-to-digital) converter 4 is arranged to receive the Y, R-Y and B-Y signals in the form of analog signals and to convert them into digital Y, R-Y and B-Y signals. A frame memory 5 is arranged to store the digital Y signal and the digital R-Y and B-Y signals outputted from the A/D converter 4. The frame memory 5 is composed of two FIFO memories as shown in FIG. 2.

A digital signal processing part 6 is arranged to perform various processes on the digital Y signal and the digital R-Y and B-Y signals, including among others a skew compensation process and a process for making these signals line-sequential or simultaneous while they are in the digital form. A D/A (digital-to-analog) converter 7 is arranged to convert into analog signals, respectively, the digital Y, R-Y and B-Y signals after the processes of the digital signal processing part 6. A recording signal processing part 9 is arranged to form a recording image signal by performing various processes such as modulation on the analog Y signal and the analog R-Y and B-Y signals outputted from the D/A converter 7. Reference numerals 17 and 18 denote change-over switches 17 and 18. A magnetic head 10 is arranged to record or reproduce signals on or from a magnetic disc 11. A motor 16 is arranged to rotate the magnetic disc 11. A reproduced signal processing part 8 is arranged to receive the analog Y, R-Y and B-Y signals reproduced by the magnetic head 10 from the magnetic disc 11 and to restore them to their original states by performing a demodulation process, etc., on these signals. A timing signal generator 12 is arranged to generate various timing signals for control over the actions to be performed by various parts. An encoder 15 is arranged to form a TV signal of the NTSC system, for example, from the analog Y, R-Y and B-Y signals outputted from the reproduced signal processing part 8. A control part 14 is arranged to control the actions of the whole system.

The recording operation of the electronic still video camera which is arranged as shown in FIG. 1 and as described above is performed as described below:

Referring to FIG. 1, when an instruction for shooting and recording is received from an operation part which is not shown, the control part 1 shifts the connecting positions of the change-over switches 17 and 18 to their terminals R. An image is obtained from the photo-taking lens part 1 through the diaphragm mechanism 2. The image sensor 3 then converts the image into an image signal. The image signal is inputted to the image signal processing part 13. The image signal processing part 13 forms the Y signal and the R-Y and B-Y signals from the image signal (consisting of, for example, R, B and G signals) and supplies these signals to the A/D converter 4 via the change-over switch 18.

At the A/D converter 4, the Y, R-Y and B-Y signals are converted into digital signals. The digital Y, R-Y and B-Y signals are temporarily stored in the frame memory 5. After that, The digital Y, R-Y and B-Y signals are read out from the frame memory 5 and inputted to the digital signal processing part 6. The digital signal processing part 6 then performs various processes including a skew compensation process on the digital Y, R-Y and B-Y signals and a process of making the R-Y and B-Y signals line-sequential while they are in the form of digital signals. The digital signals processed are inputted to the D/A converter 7 to be converted respectively into an analog Y signal and analog R-Y and B-Y signals. The analog Y signal and the analog R-Y and B-Y signals outputted from the D/A converter 7 are supplied to the recording signal processing part 9 to be made into a recording image signal through a modulation process, etc.

The recording image signal outputted from the recording signal processing part 9 is supplied to the magnetic head 10 via the change-over switch 17 which is connected to its terminal R. The magnetic head 10 then records the recording image signal on the magnetic disc 11 which is being rotated by the motor 16.

The electronic still video camera which is shown in FIG. 1 and arranged as described in the foregoing performs a reproducing operation as described below:

Referring to FIG. 1, when an instruction for the reproducing operation is given by the operation part which is not shown, the control part 14 connects the change-over switches 17 and 18 to their terminals P. The magnetic disc 11 is rotated by the motor 16. The magnetic head 10 traces a recording track formed on the magnetic disc 11 to reproduce the signal recorded on the disc 11. The reproduced signal is inputted to the reproduced signal processing part 8 through the change-over switch 17 which is connected to its terminal P.

The reproduced signal processing part 8 performs various processes, such as a demodulation process, on the reproduced signal to restore the analog Y signal and the analog R-Y and B-Y signals included in the reproduced signal to their original states. These analog signals are supplied to the A/D converter 4 through the change-over switch 18 which is connected to its terminal P.

The A/D converter 4 converts the Y signal and the R-Y and B-Y signals into digital signals. The digital Y, R-Y and B-Y signals are temporarily stored in the frame memory 5. After the temporary storage, the digital Y, R-Y and B-Y signals are read out from the frame memory 5 and are inputted to the digital signal processing part 6. The digital signal processing part 6 then performs various processes including a skew compensation process on the digital Y, R-Y and B-Y signals and a process for making the digital R-Y and B-Y signals simultaneous while these signals are in the form of digital signals. The digital signals thus processed are inputted to the D/A converter 7 to be converted into an analog Y signal and analog R-Y and B-Y signals. The analog Y, R-Y and B-Y signals thus obtained is inputted to the encoder 15. The encoder 15 then converts these analog signals into a TV signal of, for example, the NTSC system. The TV signal thus obtained is supplied, for example, to an external monitor or the like.

Figure 3:
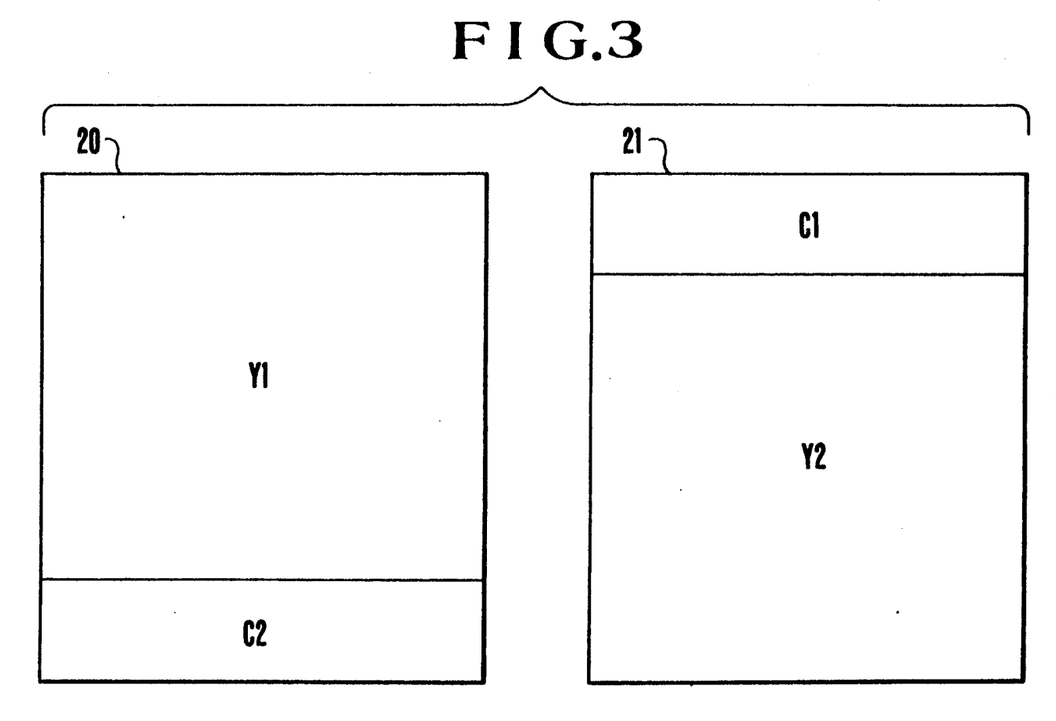
FIG. 3 shows the data-storing states of field memories 20 and 21 shown in FIG. 2.

FIG. 2 shows in detail the arrangement of the frame memory 5 shown in FIG. 1. In FIG. 2, reference numerals 22 to 26 denote data selectors. Numerals 20 and 21 denote field memories which are FIFO memories. FIG. 3 shows the data-storing states of the field memories 20 and 21.

The frame memory 5 which is arranged as shown in FIG. 2 stores an image signal for one frame. In case a where, as shown in FIG. 3, an address area of the frame memory 5 in which the Y signal of a first-field image signal is stored is assumed to be Y1; an address area in which the R-Y and B-Y signals of the first field image signal are stored is assumed to be C1; an address area in which the Y signal of a second-field image signal is stored is assumed to be Y2; and an address area in which the R-Y and B-Y signals of the second-field image signal are stored is assumed to be C2, the address areas are set as follows: in the field memory 20, the address area Y1 is set at a high-order address and the address area C2 is set at a low-order address. In the field memory 21, the address area C1 is set at a high-order address and the address area Y2 is set at a low-order address.

Referring to FIG. 3, the amount of data storage of the Y signal storing areas differs from that of the R-Y and B-Y signal storing areas in these field memories, because the sampling frequency for sampling the R-Y and B-Y signals is lower than the sampling frequency for sampling the Y signal. The former is ¼ of the latter in the case of this embodiment. Further, the signal bands of the R-Y and B-Y signals are located lower than the signal band of the Y signal. Therefore, the R-Y and B-Y signal sampling frequency can be set at a lower frequency. Besides, the arrangement to make the R-Y and B-Y signal storing area smaller than the Y signal storing area economizes the use of the capacity of each field memory.

Figure 4:
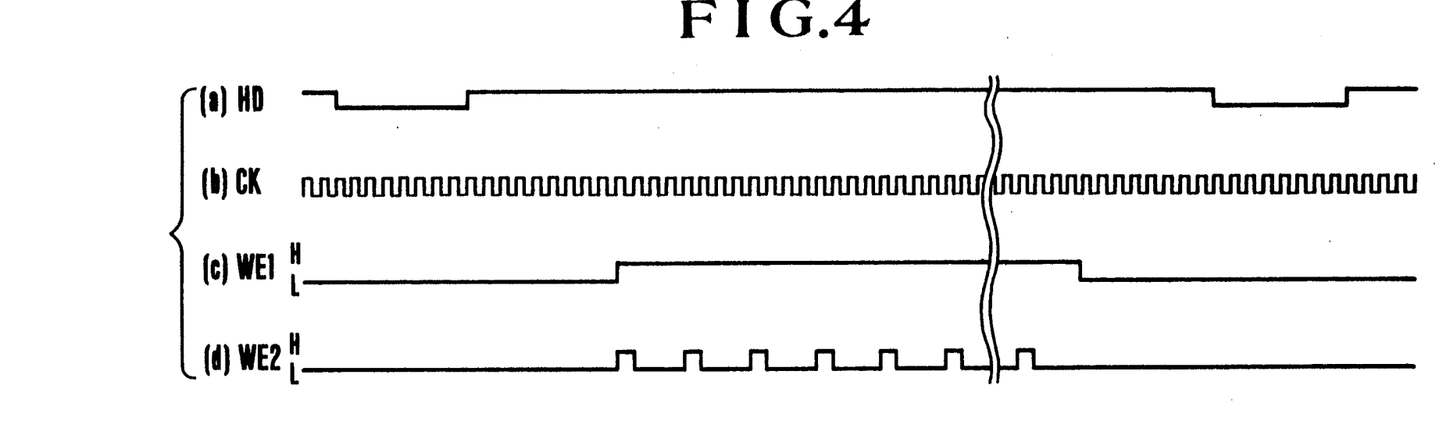
FIG. 4 is a timing chart showing timing signals of varied kinds arranged to be supplied to the field memories 20 and 21 shown in FIG. 2.

The data-storing action of the frame memory 5 which is arranged as shown in FIG. 2 is described below with reference to FIG. 4 which is a timing chart:

The timing chart of FIG. 4 shows timing signals of varied kinds arranged to be supplied to the field memories 20 and 21. In FIG. 4, a part (a) shows a horizontal synchronizing (hereinafter abbreviated to sync) signal HD; a part (b) a clock pulse signal CK to be supplied to the field memories 20 and 21; a part (c) a write enable signal WE1 for allowing the data of the Y signal (hereinafter referred to as Y data) to be stored in the field memories 20 and 21; and a part (d) a write enable signal WE2 for allowing the data of the R-Y and B-Y signals (hereinafter referred to as R-Y and B-Y data) to be stored in the field memories 20 and 21.

The field memories 20 and 21 are arranged to store the Y data for one sample every time one pulse of the clock pulse signal CK is inputted during the high-level (hereinafter abbreviated to H, as shown in FIG. 4) period of the write enable signal WE1; and to store the R-Y and B-Y data for one sample every time one pulse of the clock pulse signal CK is inputted during the H period of the write enable signal WE2.

Referring to FIG. 2, in storing image data for one frame, the Y data and the R-Y and B-Y data of the first-field image signal are first inputted. The input Y data and the input R-Y and B-Y data are supplied via the data selectors 22 and 23 to the field memories 20 and 21 to be stored in the image data storing areas Y1 and C1 for the first field, respectively (see FIG. 3).

At this time, the write enable signal WE1 and the clock pulse signal CK are inputted to the field memory 20. To the field memory 21 are supplied the write enable signal WE2 and the clock pulse signal CK.

Next, the Y data and the R-Y and B-Y data of the second-field image signal are inputted. The input Y data and the input R-Y and B-Y data are exchanged and outputted from the data selector 22; and then are supplied via the data selector 23 to the field memories 20 and 21 to be stored respectively in the image data storing areas Y2 and C2 for the second field (see FIG. 3). At that time, the write enable signal WE2 and the clock pulse signal CK are inputted to the field memory 20, and the write enable signal WE1 and the clock pulse signal CK are inputted to the field memory 21.

As described above, the image data for one frame is stored in the field memories 20 and 21 of FIG. 2, as shown in FIG. 3.

Further, in storing image data for one field in the frame memory 5 arranged as shown in FIG. 2, it suffices to store only the first-field image data.

Figure 5:
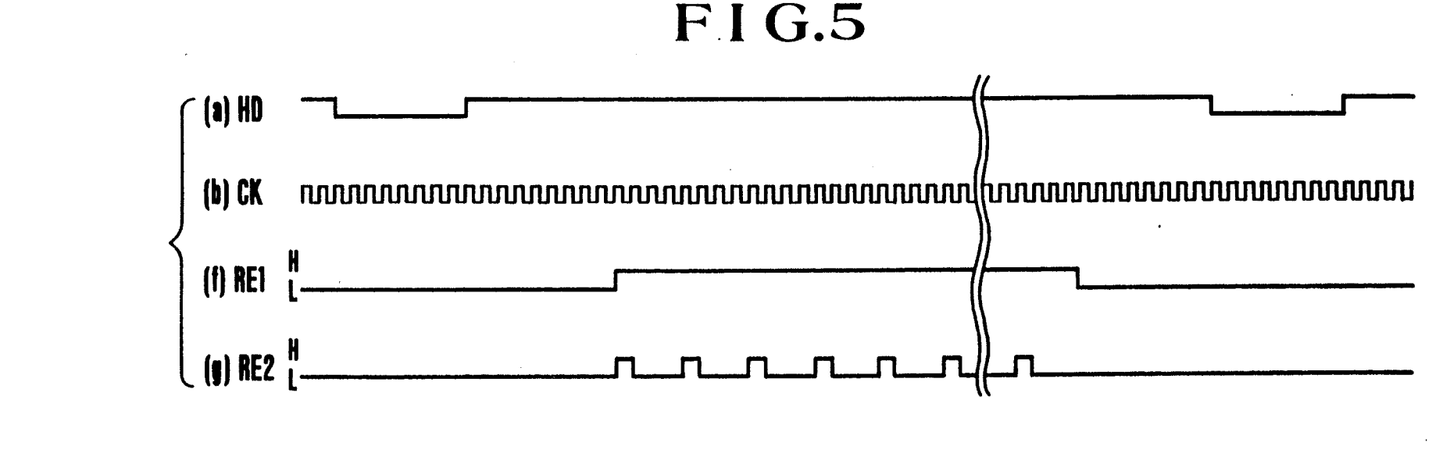
FIG. 5 is a timing chart showing timing signals also to be supplied to the same field memories 20 and 21.

Data reading from the frame memory 5 which is arranged as shown in FIG. 2 is performed as described below with reference to FIG. 5:

FIG. 5 is a timing chart showing the timing signals of varied kinds to be supplied to the field memories 20 and 21 shown in FIG. 2. In FIG. 5, a part (a) shows the horizontal sync signal HD; a part (b) the clock pulse signal CK to be supplied to the field memories 20 and 21; a part (f) a read enable signal RE1 for reading out the Y data stored in the field memories 20 and 21; a part (g) a read enable signal RE2 for reading out the R-Y and B-Y data stored in the field memories 20 and 21.

The field memories 20 and 21 are arranged as follows: the Y data for one sample is read out every time one pulse of the clock pulse signal CK is inputted during the high-level (H) period of the read enable signal RE1. The R-Y and B-Y data for one sample is read out every time one pulse of the clock pulse signal CK is inputted during the high-level period of the read enable signal RE2.

In reading out image data for one frame from the frame memory 5 which is arranged as shown in FIG. 2, the embodiment operates as follows: the Y data and the R-Y and B-Y data of the first-field image signal which are stored in the image data storing areas Y1 and C1 for the first field (see FIG. 3) are first read out. The Y data and the R-Y and B-Y data thus read out are outputted through the data selector 24. At this time, the read enable signal RE1 and the clock pulse signal CK are inputted to the field memory 20. The read enable signal RE2 and the clock pulse signal CK are inputted to the field memory 21.

Next, the Y data and the R-Y and B-Y data of the second-field image signal which are stored respectively in the second-field image data storing areas Y2 and C2 of the field memories 20 and 21 (see FIG. 3) are read out. The Y data and the R-Y and B-Y data read out are exchanged and outputted from the data selector 24. At that time, the read enable signal RE2 and the clock pulse signal CK are inputted to the field memory 20, and the read enable signal RE1 and the clock pulse signal CK are inputted to the field memory 21.

The image data for one frame stored as shown in FIG. 3 in the field memories 20 and 21 of FIG. 2 is thus read out in the above-stated manner.

Further, in reading out image data for one field from the frame memory 5 shown in of FIG. 2, it suffices to read out only the first-field image data.

Figure 6:
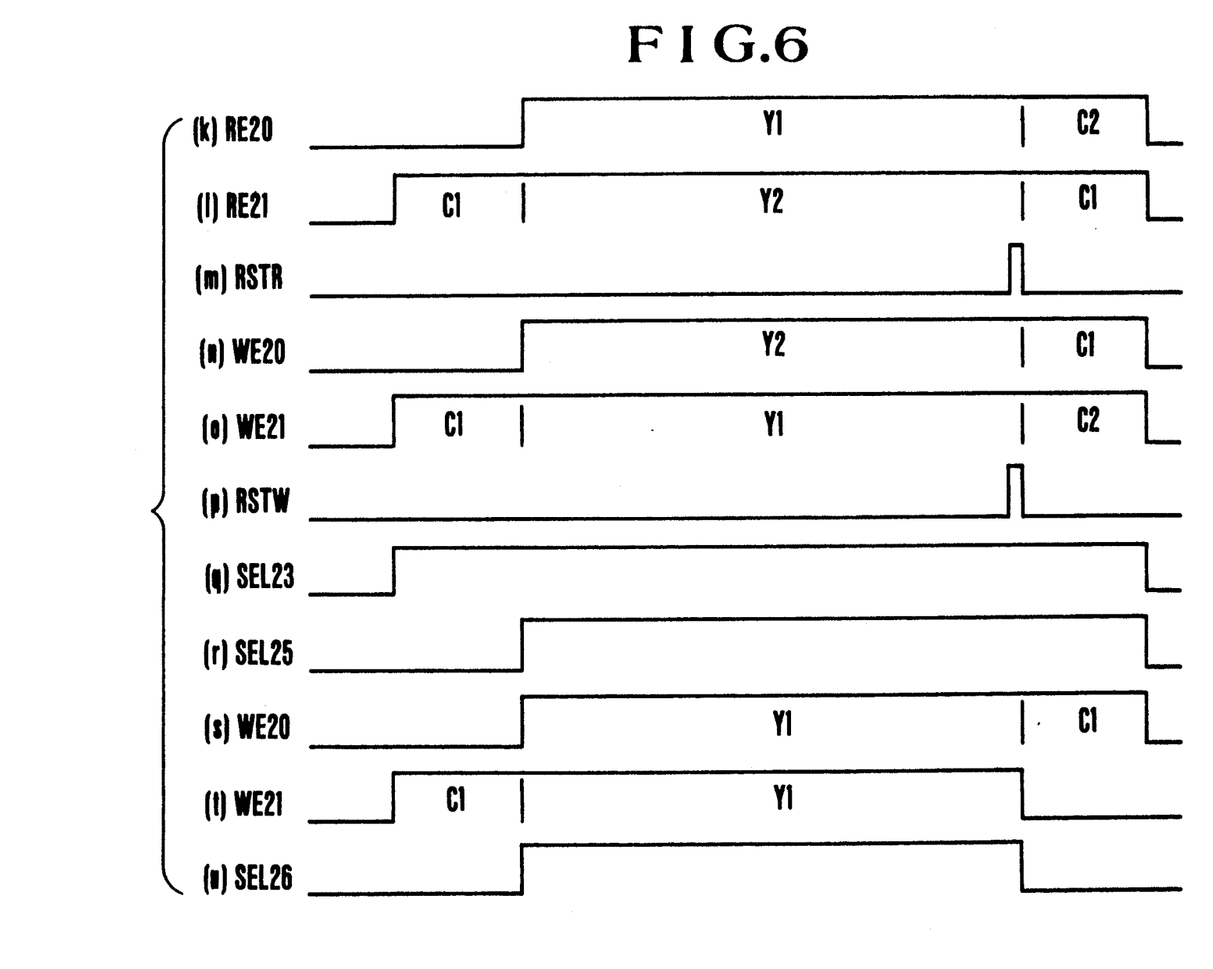
FIG. 6 is a timing chart showing timing signals also to be supplied to the same field memories 20 and 21.

With the frame memory 5 arranged as shown in FIG. 2, the image data stored in the first-field image data storing areas Y1 and C1 and the image data stored in the second-field image data storing areas Y2 and C2 of the field memories 20 and 21 are exchanged, and the image data stored in the first-field image data storing areas Y1 and C1 is dubbed onto the second-field image data storing areas Y2 and C2 of the field memories 20 and 21. The following describes the details of these actions:

FIG. 6 is a timing chart showing various timing signals to be supplied to the field memories 20 and 21 shown in FIG. 2. In FIG. 6, parts (k) and (n) show a read enable signal RE20 and a write enable signal WE20 which are to be supplied to the field memory 20. Parts (1), (o), (m) and (p) show respectively a read enable signal RE21, a write enable signal WE21, a reading address reset signal RSTR and a writing address reset signal RSTW which are to be supplied to the field memory 21. Parts (q) and (r) show data select signals SEL23 and SEL25 which are to be supplied to the data selectors 23 and 25.

The data selectors 23 and 25 are arranged to select and output data inputted to their lower stages during the high-level (H) period of the data select signals SEL23 and SEL25.

Referring to FIG. 2, in accordance with the read enable signal RE21 shown at the part (1) in FIG. 6, the R-Y and B-Y data stored in the first-field image data storing area C1 of the field memory 21 are first read out. Then, in accordance with the write enable signal WE21 shown at the part (o) in FIG. 6, the R-Y and B-Y data which have been read out are again written into the first-field image data storing area C1 of the field memory 21 through the data selectors 26, 25 and 23. Following this, in accordance with the read enable signals RE20 and RE21 shown at the parts (k) and (1) in FIG. 6, the Y data stored in the first-field image data storing area Y1 of the field memory 20 and the Y data stored in the second-field image storing area Y2 of the field memory 21 are simultaneously read out. The Y data of the first and second fields thus read out are supplied to the data selector 25 and exchanged in accordance with the data select signal SEL25 shown at the part (r) in FIG. 6. The Y data thus exchanged are supplied via the data selector 23 to the field memories 20 and 21 to be again written in the first-field image data storing area Y1 and the second-field image data storing area Y2 of the field memories 20 and 21 in accordance with the write enable signals WE20 and WE21 shown at the parts (n) and (o) in FIG. 6.

In accordance with the read enable signals RE20 and RE21 shown at the parts (k) and (1) in FIG. 6 and the reading address reset signal RSTR shown at the part (m) in FIG. 6, the R-Y and B-Y data stored in the first-field image data storing area C1 and the R-Y and B-Y data stored in the second-field image data storing area C2 are also simultaneously read out from the field memories 20 and 21. Then, in accordance with the data select signal SEL25 shown at the part (r) in FIG. 6, the first-field R-Y and B-Y data and the second-field R-Y and B-Y data are exchanged at the data selector 25. The exchanged R-Y and B-Y data are supplied via the data selector 23 to the field memories 20 and 21 to be again written into the first-field image data storing area C1 and the second-field image data storing area C2 of the field memories 20 and 21 in accordance with the write enable signals RE20 and RE21 shown at the parts (n) and (o) in FIG. 6 and the writing address reset signal RSTW shown at the part (p) in FIG. 6. By this, the first-field image data and the second-field image data stored in the field memories 20 and 21 are exchanged.

In causing the first-field image data stored in the first-field image data storing areas of the field memories 20 and 21 to be dubbed onto the second-field image data storing areas of the field memories 20 and 21, the frame memory 5 operates as follows. In this instance, the above-stated image data exchanging action is changed as follows: in place of the write enable signals WE20 and WE21 shown at the parts (n) and (o) in FIG. 6, the write enable signals WE20 and WE21 shown at the parts (s) and (t) in FIG. 6 are supplied to the field memories 20 and 21. The data select signal SEL26 shown at the part (u) in FIG. 6 is supplied to the data selector 26. Then, in accordance with these signals, the Y data of the first field is written in the second-field Y data storing area of the field memory 21, and the R-Y and B-Y data of the first field is written in the second-field R-Y and B-Y data storing area of the field memory 20. By this, the first-field image data stored in the first-field image data storing areas of the field memories 20 and 21 are dubbed onto the second-field image data storing areas of the field memories 20 and 21.

As described above, in a case where image data for one field in the image data stored in the frame memory 5 is to be read out and supplied as a reproduced image signal, for example, to an external monitor or the like, the first-field image data and the second-field image data stored in the field memories 20 and 21 constituting the frame memory 5 are exchanged, or the first-field image data stored in the first-field image data storing areas of the field memories 20 and 21 are dubbed onto the second-field image data storing areas of the field memories 20 and 21. The frame memory 5 which consists of two FIFO field memories thus can be efficiently used. In cases where field image signals of two different kinds are to be temporarily stored and one of the field image signals of the two different kinds stored is to be selectively outputted by switching them from one over to the other, the switch-over of the field image signals can be instantly accomplished. Therefore, according to the arrangement described, an image signal can be stably outputted without any image turbulence, and the operability of the image signal processing device can be enhanced.

Figure 7:
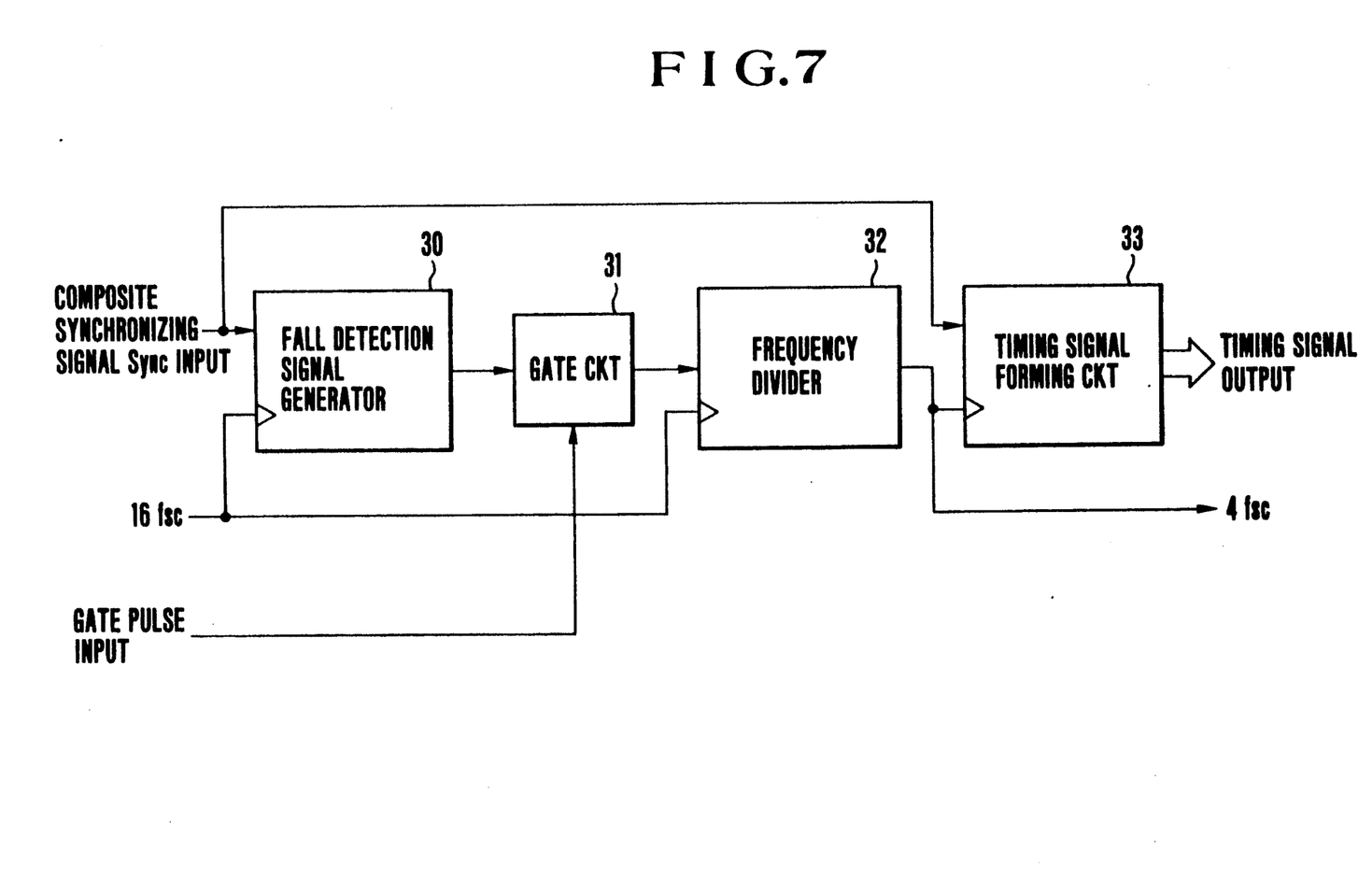
FIG. 7 is a block diagram showing in part the arrangement of a timing signal generator 12 shown in FIG. 1.
Figure 8:
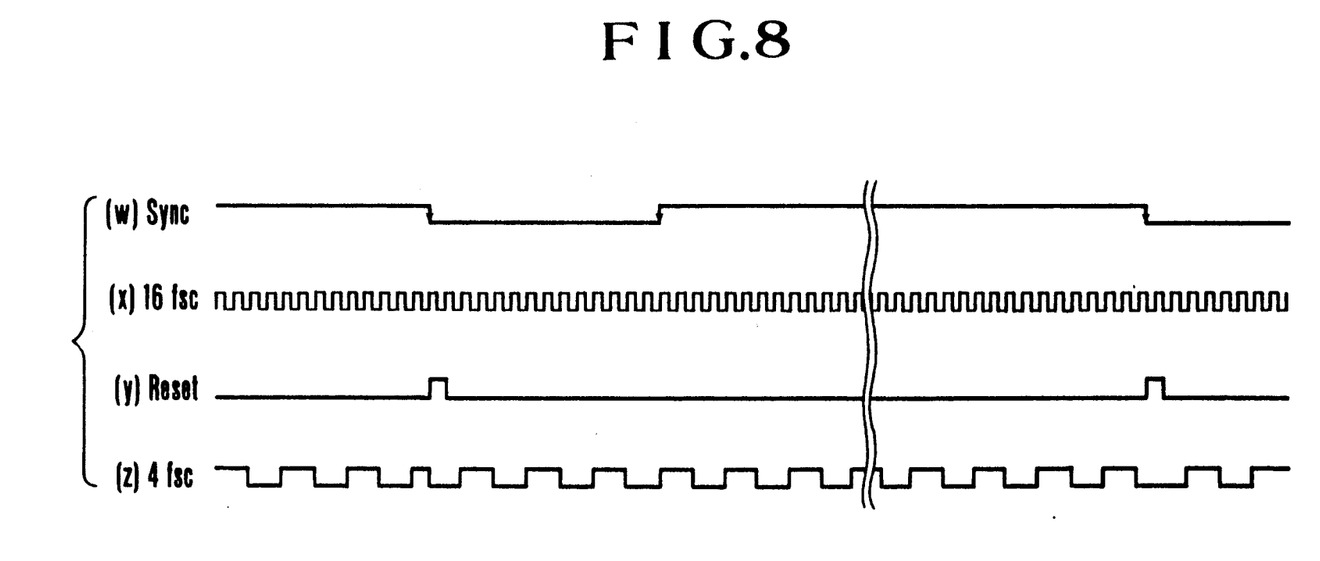
FIG. 8 shows the waveforms of the signal outputs of various parts included in the arrangement of FIG. 7.

FIG. 7 shows in part the arrangement of the timing signal generator 12 shown in FIG. 1. FIG. 8 shows the waveforms of signal outputs from the various parts of the timing signal generator 12 shown in FIG. 7. The operation of the timing signal generator 12 is described below with reference to these drawings:

Referring to FIG. 7, a fall detection signal generator 30 is arranged to detect the fall of a signal. With a reproduced signal obtained from the magnetic disc 11 by means of the magnetic head 10, a composite sync signal Sync which is separated from the reproduced signal by the reproduced signal processing part 8 and is as shown at a part (w) in FIG. 8 is inputted to the fall detection signal generator 30. The fall detection signal generator 30 is arranged to detect, in synchronism with a clock signal 16fsc which is of a frequency of 16fsc (fsc: a subcarrier frequency) and shown at a part (x) in FIG. 8, the fall of a horizontal sync signal included in the composite sync signal Sync supplied from the reproduced signal processing part 8, and to generate, in synchronism with the fall of the horizontal sync signal, a reset signal Reset which is shown at a part (y) in FIG. 8.

A gate circuit 31 is arranged to gate, according to a gate pulse inputted from a system controller which is not shown, the reset signal Reset outputted from the fall detection signal generator 30. A frequency divider 32 is arranged to form a clock signal 4fsc which is of a frequency of 4fsc as shown at a part (z) in FIG. 8 by frequency-dividing the clock signal 16fsc by four, and to be reset by the reset signal Reset outputted from the gate circuit 31. The clock signal 4fsc is thus arranged to be always synchronized with the fall of the horizontal sync signal included in the composite sync signal Sync.

A timing signal forming circuit 33 is arranged to form, in synchronism with the clock signal 4fsc supplied from the frequency divider 32, various timing signals from the composite sync signal Sync supplied from the reproduced signal processing part 8.

The gate pulse supplied to the gate circuit 31 from the system controller which is not shown is at a high level throughout a period during which the magnetic disc 11 is being rotated by the motor 16. The gate of the gate circuit 31 is opened in accordance with the high-level gate pulse throughout the period during which the magnetic disc 11 is being rotated by the motor 16. The reset signal Reset is thus allowed to be supplied to the frequency divider 32. During this period, the frequency divider 32 is reset by the reset signal Reset and generates the clock signal 4fsc which is synchronized with the horizontal sync signal included in the composite sync signal Sync.

The gate pulse supplied from the system controller which is not shown is at a low level while the magnetic disc 11 shown in FIG. 1 is not rotated by the motor 16 (throughout a period during which the composite sync signal Sync is not supplied from the reproduced signal processing circuit 8) or throughout a period during which the first-field image data and the second-field image data stored in the field memories 20 and 21 are exchanged, or the first-field image data stored in the first-field image data storing areas of the field memories 20 and 21 are dubbed onto the second-field image data storing areas of the field memories 20 and 21, as mentioned in the foregoing. Then, the gate of the gate circuit 31 is closed in accordance with the low-level gate pulse. With the gate closed, the reset signal Reset outputted from the fall detection signal generator 30 is not supplied to the frequency divider 32. The frequency divider 32 is thus not reset by the reset signal Reset during this period and is allowed to continuously generate the clock signal 4fsc which is obtained by simply frequency-dividing the clock signal 16fsc by four.

As described above, throughout a period during which an image signal recorded on the magnetic disc 11 is stored in the frame memory 5, the clock signal 4fsc is formed in synchronism with the horizontal sync signal included in the composite sync signal obtained from a reproduced signal reproduced from the magnetic disc 11 and the reproduced image signal is stored in the frame memory 5 in accordance with the clock signal 4fsc. Further, in cases where the image data stored in the frame memory 5 is read out and outputted, for example, to an external monitor or the like as a reproduced image signal, and where the first-field image data and the second-field image data stored in the field memories 20 and 21 which form the frame memory 5 are exchanged, or where the first-field image data stored in the first-field image data storing areas of the field memories 20 and 21 are dubbed onto the second-field image data storing areas of the field memories 20 and 21, the clock signal 4fsc which is obtained by frequency-dividing the clock signal 16fsc is continuously generated. With the clock signal 4fsc generated in this manner, writing and reading actions are performed on the image data at the frame memory 5 in synchronism with the clock signal 4fsc. The arrangement described above permits efficient use of the frame memory which is composed of two field memories. In a case where field image signals of two different kinds are to be temporarily stored and, after that, the stored field image signals of two different kinds are to be selectively outputted by switching them from one kind over to the other, the switch-over can be instantly accomplished, so that the image signal can be stably outputted without any image turbulence. The operability of the device thus can be enhanced in accordance with the invented arrangement.

The embodiment, as described in the foregoing, is arranged to be capable of efficiently using an image memory in a case where an input image signal is temporarily stored in the image memory and the stored image signal is read out from the memory. Besides, the invented arrangement gives an image signal processing device which excels in operability and is capable of stably outputting an image signal without any image turbulence.

What is claimed is:

1. An image signal processing device for processing image signals, comprising:
   a) a frame memory including a first-field storage area for storing a first-field image signal and a second-field storage area for storing a second-field image signal and arranged to store an image signal for one field including the first-field image signal and the second-field image signal; and
   b) memory control means for controlling the memory so that when the image signal for one frame is stored in said memory and then the second-field image signal for one frame stored in said frame memory is read out, the second-field image signal stored in said second-field storage area is changed with the first-field image signal stored in the second-field storage area, and then read out from said first-field storage area.

2. A device according to claim 1, wherein said frame memory includes two field memories.

3. A device according to claim 2, wherein said field memories include first-in/first-out type memories.

4. A device according to claim 2, wherein said image signal is composed of a luminance signal and a color information signal, and wherein each of said field memories is arranged to individually have a luminance signal storage area for storing the luminance signal and a color information signal storage area for storing the color information signal.

5. A device according to claim 1, wherein said frame memory has said first-field storage area for storing the first-field image signal disposed at a high-order address and said second-field storage area for storing the second-field image signal disposed at a low-order address.

6. A device according to claim 2, wherein said image signal is composed of a luminance signal and a color information signal, and wherein, of said two field memories, a first field memory has a storage area for storing the luminance signal of the first-field image signal disposed at a high-order address and a storage area for storing the color information signal of the second-field image signal disposed at a low-order address, and a second field memory has a storage area for storing the color information signal of the first-field image signal disposed at a high-order address and a storage area for storing the luminance signal of the second-field image signal disposed at a low-order address.

7. An image signal processing device for processing image signals, comprising:
   a) a frame memory including a first-field storage area for storing a first-field image signal and a second-field storage area for storing a second-field image signal and arranged to store an image signal for one field including the first-field image signal and the second-field image signal;
   b) memory control means for controlling the memory so that when the image signal for one frame is stored in said frame memory and then the second-field image signal for one frame stored in said frame memory is read out, the second-field image signal stored in said second-field storage area is changed with the first-field image signal stored in said second-field storage area and then read out from said first-field storage area; and
   c) system clock signal generation means for generating, when an input image signal is stored in said frame memory, a system clock signal for operating said frame memory by frequency-dividing a source oscillation clock signal by using a frequency divider arranged to be reset in synchronism with a horizontal synchronizing signal included in the input image signal, and for generating, when the second-field image signal is read out from said frame memory by said memory control means and the read-out second-field image signal is again stored in the first-field storage area of said frame memory, a system clock signal for operating said frame memory by continuously frequency-dividing the source oscillation clock signal without resetting said frequency divider in synchronism with the horizontal synchronizing signal.

8. A device according to claim 7, wherein said frame memory includes two field memories.

9. A device according to claim 8, wherein said field memories include first-in/first-out type memories.

10. A device according to claim 8, wherein said image signal is composed of a luminance signal and a color information signal, and wherein each of said field memories is arranged to individually have a luminance signal storage area for storing the luminance signal and a color information signal storage area for storing the color information signal.

11. A device according to claim 7, wherein said frame memory has said first-field storage area for storing the first-field image signal disposed at a high-order address and said second-field storage area for storing the second-field image signal disposed at a low-order address.

12. A device according to claim 8, wherein said image signal is composed of a luminance signal and a color information signal, and wherein, of said two field memories, a first field memory has a storage area for storing the luminance signal of the first-field image signal disposed at a high-order address and a storage area for storing the color information signal of the second-field image signal disposed at a low-order address, and a second field memory has a storage area for storing the color information signal of the first-field image signal disposed at a high-order address and a storage area for storing the luminance signal of the second-field image signal disposed at a low-order address.

13. An image signal processing device for processing an image signal composed of a luminance signal and a color information signal, comprising:
   a) a frame memory capable of storing an image signal for one frame, including first and second field memories each of which has a storage area for storing an image signal for one field; and
   b) memory control means arranged to have a first-field image signal and a second-field image signal serially inputted thereto, to store the luminance signal of the first-field image signal in a high order address of the first field memory, to store the color information signal of the first-field image signal in a high-order address of the second field memory, to store the color information signal of the second-field image signal in a low-order address of the first field memory and to store the luminance signal of the second-field image signal in a low-order address of the second field memory.

14. A device according to claim 13, wherein an amount of information of the color information signal is smaller than that of the luminance signal.

15. A device according to claim 13, wherein said field memories include first-in/first-out type memories.

* * * * *